Sept. 9, 1969   W. E. JORDAN ET AL   3,466,125
FOCUS ADJUSTING CIRCUITRY FOR A SLIDE PROJECTOR
Filed June 23, 1967   2 Sheets-Sheet 1

WILLIAM E. JORDAN
FRANKLIN D. KOTTLER
INVENTORS

BY James J Wood
Robert W Hampton

ATTORNEYS

Sept. 9, 1969   W. E. JORDAN ET AL   3,466,125
FOCUS ADJUSTING CIRCUITRY FOR A SLIDE PROJECTOR
Filed June 23, 1967   2 Sheets-Sheet 2

WILLIAM E. JORDAN
FRANKLIN D. KOTTLER
INVENTORS

BY *James J. Wood*
*Robert W. Hampton*

ATTORNEYS

3,466,125
FOCUS ADJUSTING CIRCUITRY FOR A SLIDE PROJECTOR

William E. Jordan and Franklin D. Kottler, Rochester, N.Y., assignors to Eastman Kodak Company, Rochester, N.Y., a corporation of New Jersey
Filed June 23, 1967, Ser. No. 648,265
Int. Cl. G03b 3/12
U.S. Cl. 353—101               5 Claims

ABSTRACT OF THE DISCLOSURE

Focus adjusting circuitry for a slide projector having an objective lens, and first and second focal distances measured on opposite sides of the objective lens, the first focal distance being defined as being measured from a photographic transparency slide to a pilot image lens apparatus arranged to project a pilot image on the photographic transparency. The second focal distance by definition is measured from the objective lens to the viewing screen. Photoconductive transducer apparatus is arranged to form two resistive arms of a bridge, each arm having an ohmic magnitude which is a function of the incident radiant energy reflected from the pilot image on the photographic transparency, the photoconductive transducer apparatus defining a null when the reflected light produces equal resistive arms. Amplifying channels are provided on each output arm of the bridge, the unbalanced condition of the bridge providing error signals which are applied to a reversible electric motor to maintain the first focal distance constant. Additionally, remote switching apparatus is provided for disabling the amplifying channels and holding the first focal distance constant, while applying selectable polarized signals to the reversible electric motor to change the second focal distance as desired.

CROSS-REFERENCES TO RELATED APPLICATIONS

Reference is made to commonly assigned copending U.S. patent application Ser. No. 648,264, entitled "Automatic Focusing Photographic Projector Apparatus" filed in the names of Franklin D. Kottler and Frederick K. Leutung on June 23, 1967.

BACKGROUND OF THE INVENTION

Field of the invention

This invention relates to focus adjusting circuitry for a slide projector for providing electric signals so that the distance from a photographic transparency to a pilot image projecting means may be varied automatically, to keep the image on the viewing screen in focus regardless of environmental or other changes in the planar face of the photographic transparency slide, and in addition, for providing signals for enabling the distance from the objective lens to a viewing screen to be varied as desired.

Description of prior art

The classic photographic projector utilizes a source of light energy which, through a condensing lens system, illuminates a photographic transparency, the image of which is projected upon a viewing screen through a movable objective lens. In the usual system, the objective lens is displaced in line to change the focal length to the object plane as well as to the plane of the viewing screen—these distances are inter-related. The customary practice is to maintain the screen or viewing surface at a fixed distance, and change the distance from the slide transparency to the lens to accommodate for various spurious conditions in the surface of the slide transparency resulting either from the thermal environment in which the slide transparency is utilized or from inherent defects in the slide transparency itself or its frame.

Various solutions have been proposed to accommodate for the spurious changes in the slide transparency and automatic focusing of the distance from the slide to the objective lens has been taught. For example, U.S. Patent 3,249,001 to Stauffer teaches the utilization of a pair of spaced photoelectric cells which, when the projector is in proper focus, are equally illuminated by the reimage of the reflected radiant energy. As the slide transparency is displaced from nominal position as a result of changes in the slide transparency, it is thus moved along the optical axis with the concomitant effect that the reimage of the reflected energy also moves to illuminate more intensely one of the photoelectric cells. An electrical signal is derived which is a function of this light intensity on the one cell, and a reversible D.C. motor is provided to receive this electrical signal so as to move the objective lens and also reposition the reimage of the reflected energy at the null or balance point on the photoelectric cells.

SUMMARY OF THE INVENTION

The instant invention relates to focus adjusting circuitry for a slide projector having first and second focal distances defined on opposite sides of an objective lens, the first focal distance being measured between a photographic slide and a pilot image means arranged to project a pilot image on the photographic slide, the second focal distance being measured from the objective lens to a viewing screen. The circuitry comprises a bridge, two resistive arms of which are provided by photoconductive transducer means arranged to receive incident radiant energy from the pilot image, the photoconductive transducer providing a null when the photographic slide is in optimum position for display on a screen.

Two amplifying channels are connected to the bridge output to receive signals which are applied to a reversible electric motor, the rotation of the electric motor producing corrective action to maintain constant the first focal distance. Additionally, remote switching means are provided, the amplifying channels being disabled upon actuation of the remote switching means and, selectable polarized signals are applied to the reversible electric motor to change the second focal distance as desired.

Accordingly, it is an object of this invention to provide focus adjusting circuitry for a slide projector for enabling corrective action for maintaining constant the focal distance between a slide transparency and a pilot image means, while permitting the focal distance between the objective lens and the viewing screen to be varied as desired.

The novel features which are believed to be characteristic of the invention are set forth with particularity in the appended claims. The invention itself, however, both as to its organization and method of operation together with further objects and advantages thereof, may best be understood by reference to the description to follow taken in connection with the accompanying drawings.

DESCRIPTION OF THE PREFERRED EMBODIMENT

Figure 1:
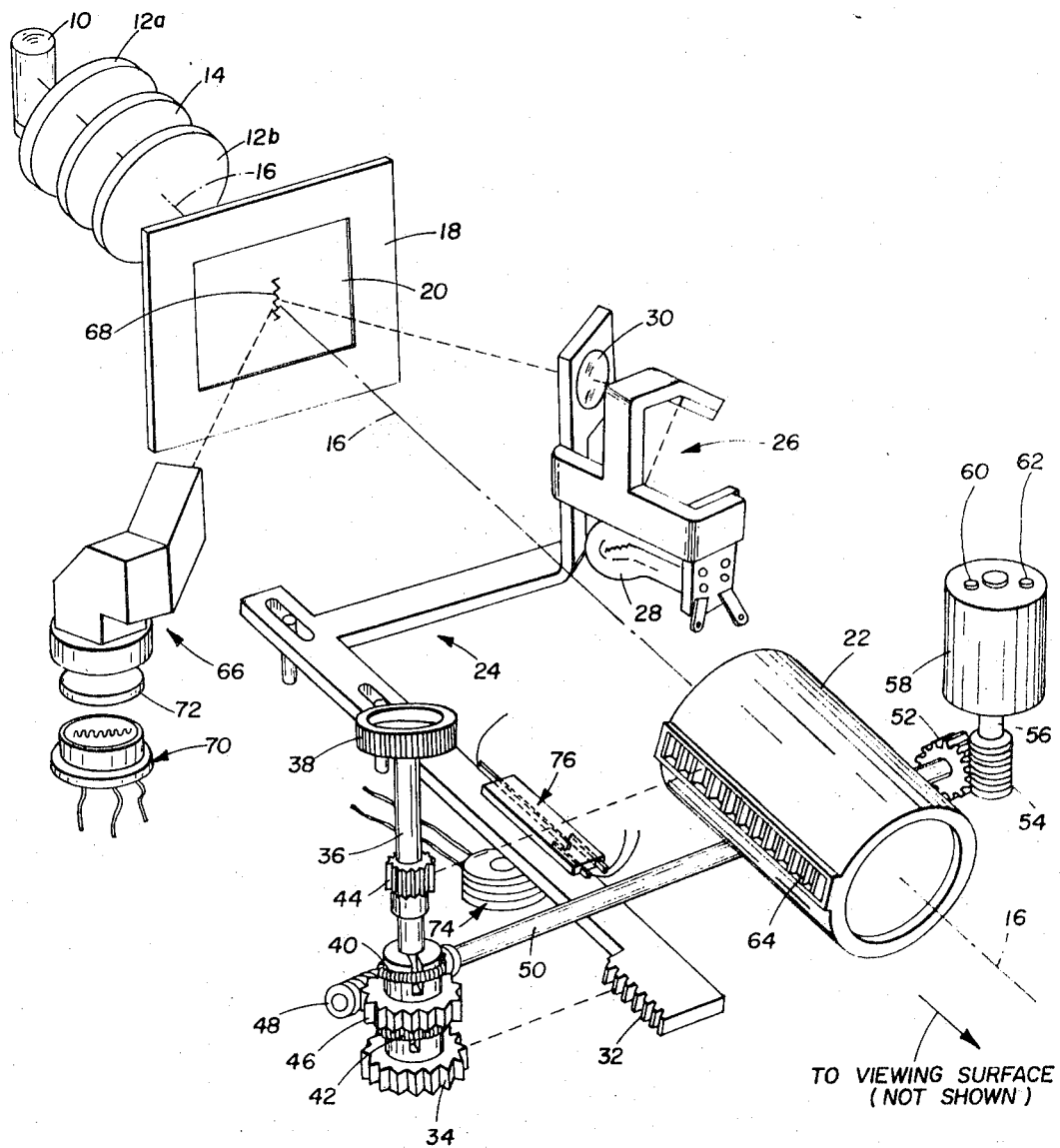
FIG. 1 is a pictorial schematic showing the relationship of the various elements of the automatic focusing slide projector apparatus.

Referring now to FIG. 1, reference numeral 10 designates a lamp with a proximity reflector for transmitting a light beam through condensing lenses 12a and 12b, and through a filter 14 along the optical or projection axis 16 of the photographic projector. The purpose of the filter 14 is to eliminate as much of the infrared rays as possible, these latter rays producing heat which has deleterious effects on the photographic transparency.

The slide to be projected comprises a frame 18 and a photographic transparency 20, suitably supported by appropriate holding means so that the intelligence on the transparency 20 will be projected by the objective lens indicated at 22, along the optical axis 16 to a viewing surface or screen not shown on the drawing.

A support member means indicated generally at 24, has integrally mounted therewith a pilot image projecting means, indicated generally at 26, and comprising a pilot lamp 28, a lens 30 and a mirror (not shown on the drawing in the interests of clarity), the mirror merely serving to reflect the light from pilot lamp 28 to the lens 30.

The support member 24 includes a rack 32 which is arranged to operatively engage pinion 34 on a focus shaft 36. A knob 38 is secured to one end of focusing shaft 36 for manually providing rotational displacement to the shaft 36.

The focusing shaft 36 also includes coaxially mounted slip clutches 40, 42 and gears 44, 46. The gear 46 on focusing shaft 36 engages worm 48 which is mounted on transmitting shaft 50. At the other end of transmitting shaft 50, a gear 52 is arranged to operatively engage a worm 54 suitably mounted on the drive shaft 56 of a D.C. reversible motor 58 having input terminals indicated at 60, 62.

The objective lens 22 includes a rack 64 arranged on its outer housing for cooperative engagement with pinion 44 on focusing shaft 36, so that the objective lens may be rectilinearly displaced along the optical axis 16.

An optical means, indicated generally at 66 is arranged in proximity to the slide so as to project the image 68 of the filament of lamp 28 to a photoconductive transducer means indicated generally at 70. The particular arrangement of optical means 66 is a matter of design consideration, and in the practical embodiment includes a lens and two mirrors not shown in FIG. 1.

Figure 3:
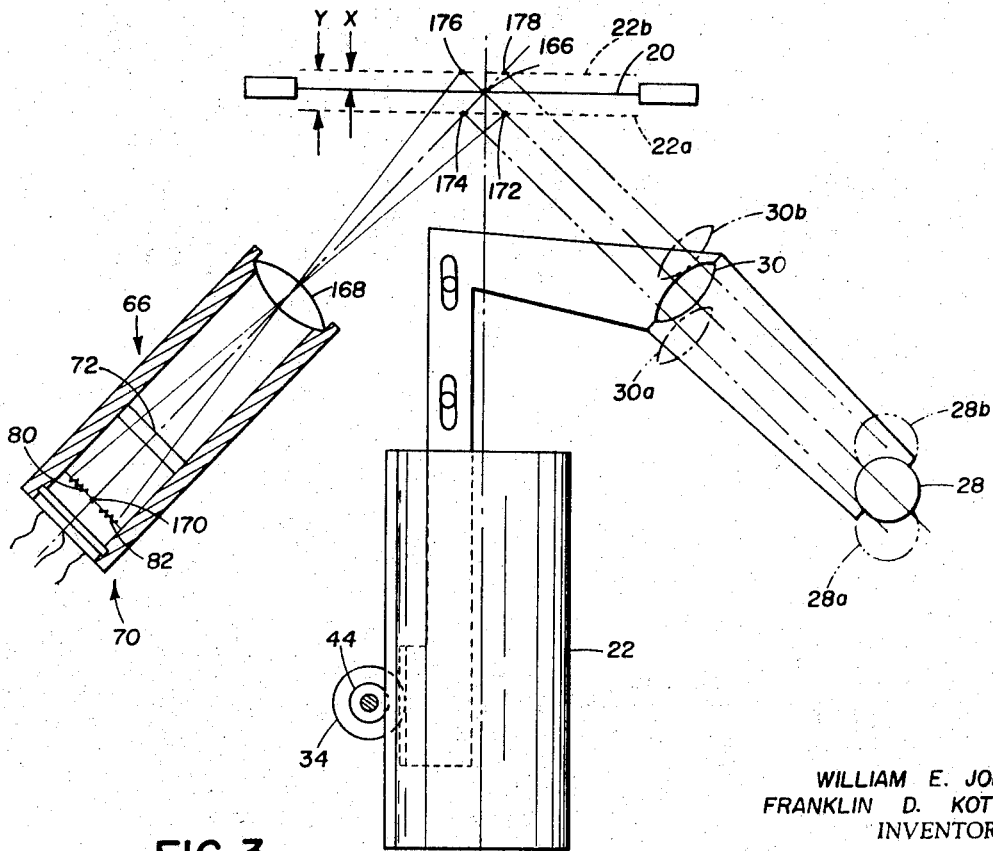
FIG. 3 is schematic view, used in explaining the invention and showing the relationship of the support member to the objective lens, and the movement of the pilot image projecting means to achieve proper focusing.

In FIG. 3 in the interests of clarity the optical means 66 is indicated schematically with only the principal functional elements shown to enable an understanding of the invention. The light reflected from image 68 on the front surface of the photographic transparency 20 may be reflected by any suitable lens system through a filter 72 to the photoconductive transducer means 70.

Depending upon the transducer means 70 selected, the sensitivity of the transducer's performance may be increased by selecting an infrared type filter positioned in the path of the reflected radiant energy from image 68; this type filter passes only infrared radiation while substantially blocking the visible portion of the spectrum.

This arrangement has the dual advantage of (a) reducing the possibility of spurious response, and (b) increasing the sensitivity of the transducer means 70. In the practical embodiment described herein, the photoconductive transducer means is of the cadmium selenide type.

Clamping means are indicated generally at 74, and siwtch means are indicated generally at 76. In the practical embodiment shown, the clamping means is illustrated as an electromagnet, although a solenoid may also be used to advantage; similarly the switch means is here illustrated as a magnetic reed switch of the single pole double throw type, having one contact normally closed, although a microswitch may also be utilized. The automatic focusing photographic projector apparatus depicted in FIG. 1 is described solely for purposes of completeness; it is separately described and claimed in copending application Ser. No. 648,264, filed on June 23, 1967.

Figure 2:
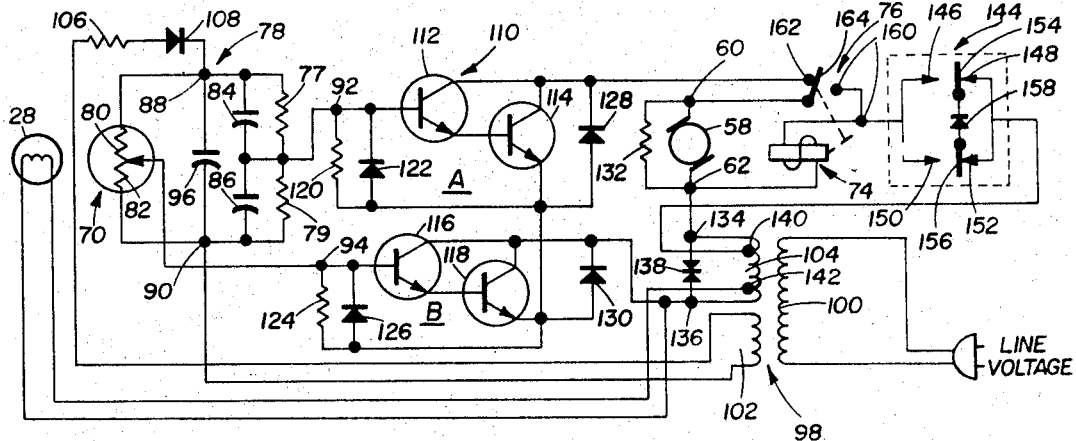
FIG. 2 is a circuit diagram showing the automatic focusing and remote focusing circuitry in accordance with the invention.

The foci adjusting means for actuating the mechanism of FIG. 1, is depicted in the circuitry of FIG. 2.

The circuitry of FIG. 2 provides the signals for actuating the D.C. reversible motor 58. A bridge circuit indicated generally at 78, comprises resistors 77, 79 arranged to form two arms of the bridge, while the photoconductive transducer means 70 is electrically arranged to provide the other two resistive arms indicated at 80, 82 respectively. Resistors 77 and 79 are shunted by capacitors 84, 86 respectively. The input terminals of the bridge circuit are indicated at 88, 90, the output being taken at terminals 92, 94 respectively. A capacitor 96 is connected between input terminals 88, 90 as shown.

An isolation transformer, indicated generally 98 comprises primary 100 and secondaries 102, 104. The secondary winding 102 energizes the bridge circuit 78 through a rectifying means comprising resistor 106, and diode 108 to provide rectified A.C. to energize the bridge circuit 78, the resistor-diode series combination 106, 108 being connected to one side of secondary 102 as shown.

The output at 92, 94 of the bridge circuit 78 is applied to a transistor network indicated generally at 110; this latter network is intended to provide discrete signal transfer channels for clockwise (CW) and counterclockwise (CCW) rotation of reversible D.C. motor 58. For discussion purposes only these channels have arbitrarily been identified as channel A for CW rotation and channel B for CCW rotation.

The transistor network 110 comprises NPN transistors 112, 114, 116 and 118 each having a base, a collector and an emiter as indicated by the conventional symbols in the drawing. The transistors 112, 114 (forming in part the signal path for the CW channel A) are connected in amplifying cascade, the collectors being electrically common, and the emitter of transistor 112 being connected to the base of transistor 114. Similarly, transistors 116, 118 (forming in part the signal path for the CCW channel B) are arranged in amplifying cascade, the respective collectors being electrically connected in common, and the emitter of transistor 116 is connected to the base of transistor 118. Also the emitters of transistors 114 and 118 are electrically common.

The CW channel A is connected to the output terminal 92 of the bridge circuit 78, at the base of transistor 112. Similarly CCW channel B is connected to the output terminal 94 at the base of transistor 116.

Resistor 120 is connected in parallel with diode 122, the parallel combination being electrically connected between the base of transistor 112, and the emitter of transistor 114. Similarly, resistor 124 in parallel with diode 126, is connected between the base of transistor 116 and the emitter of transistor 118.

A diode 128 is connected with its cathode to the collector of transistor 114, and its anode to the emitter of transistor 114. In a similar manner, the diode 130 is connected with its cathode to the collector of transistor 118 and its anode to the emitter of transistor 118.

The D.C. reversible motor terminals 60, 62 are shunted by resistor 132.

The transformer secondary 104 has output terminals indicated at 134, 136 across which a thyrector diode transient voltage 138 is connected. The secondary 104 also has taps identified at 140, 142. Heater current for the filament of lamp 28 is provided across tap 142 and terminal 136 of secondary 104 as indicated.

A remote focusing switch indicated generally at 144 is shown in FIG. 2 in the rest position. This switch comprises four contacts 146, 148, 150 and 152. Blade elements are indicated at 154 and 156, the anchor or hinge ends (unnumbered) of the blade elements 154, 156 being connected in circuit with diode 158. Contacts 148 and 152 are connected in common, and to the tap 140 on the secondary 104 of transformer 100. Contacts 146 and 150 are connected in common, and to contact 160 of magnetic reed switch 76. (For convenience in FIG. 2 the contact 160 has been shown separated, but in the practical embodiment these contacts are physically and electrically one.)

The magnetic reed switch 76 also includes a contact 162 and reed element 164. In the rest position reed element 164 is closed to contact 162 as shown.

The clamping means 74, here shown as an electromagnet, has one end of its coil connected to contact 160 of magnetic reed switch 76, the other end of the coil being connected to input terminal 62 of reversible D.C. motor 58.

OPERATION

The practice of the invention can best be appreciated by considering a step-by-step approach by the operator to place the photographic projector apparatus in optimum condition for viewing; reference will accordingly be made to FIGS. 1, 2 and 3. The apparatus is appropriately energized and a slide is placed in position in any convenient manner. The manual knob 38 (FIG. 1) is then rotated to move the objective lens 22 the proper distance toward or away from a viewing screen which is set up at any convenient distance from the projector. Rotary displacement of the manual knob 38 causes the objective lens 22 to be rectilinearly displaced by means of pinion 44 which engages rack 64 on the objective lens 22, the slip clutch 40 providing selective disengagement which prevents the rotary displacement of focus shaft 36 from being transmitted to the support member 24 to disturb the setting between the pilot image projecting means 26 and the slide.

It is well known in the art that the slides undergo physical changes identified as creeping, buckling or popping which distorts the planar face of the photographic transparency. Some of these spurious conditions are the result of the changing thermal environment experienced by the slide, while others are due to defects in the photographic process or to the somewhat wider processing tolerances permitted by some manufacturers for the cardboard or plastic frame for the transparency. The net result is that the slide is moved along the optical or projection axis 16 so that steps must be taken to reposition the objective lens 22 to ensure proper focusing.

The automatic focusing of FIG. 2 provides a means whereby automatic focusing is obtained regardless of any changes in the face of the transparency 20. An image of the filament of lamp 28 (FIG. 1) is formed on the front surface of the transparency 20, the image appearing as 68 on surface 20. The image 68 is projected through the optical means 66, through the filter 72, to the photoconductive transducer means 70. The photoconductive transducer 70 is a unit in which the electrical resistance decreases as light falls on the exposed surface. Various materials may be used in this type of cell, among those being selenium, germanium, thallous sulfide, lead sulfide, silicon, and cadmium sulfide. These materials respond to light in the visible spectrum as well as to other wavelengths in the spectrum, such as infrared and ultraviolet. In the practical embodiment transducer 70 is of the cadmium selenide type. The filter 72 is selected so that the transducer 70 will be particularly sensitive in the infrared region.

In order to appreciate what happens at the plane of the transparency, reference will now be had to FIG. 3. The photographic transparency 20 is shown in the normal position by the heavy lines. When the slide is cool, the light from lamp 28 is projected through lens 30 to the point 166 on the transparency 20. From here the light is transmitted through a lens indicated symbolically at 168 of the optical means 66 to the point 170 on the photoconductive transducer 70. This is the nominal position, and the effect is to electrically produce equal resistance magnitudes for resistors 80, 82 (FIG. 2). Let us assume now that some condition occurs which causes the transparency 20 to be displaced to the position indicated at 22a. In this particular situation the light from the lamp 28 is focused through lens 30 to the point 172 which, as indicated by the principal light ray, passes through the lens 168 through filter 72 to the surface of the transducer 70 which comprises resistor 80. As may be seen from FIG. 3, the resistor 80 now receives more light than the surface comprising resistor 82, causing the resistor 80 to become lower in electrical resistance. In order to accommodate for this spurious condition of the transparency, it is necessary for the lamp 28 and lens 30 to move to a new position 28a, 30a, respectively so that the image 68 is now focused on point 174 to produce a null condition on the photoconductive transducer 70. Similarly, if the slide were deformed to the position 22b, the filament image 68 would be focused at point 176 resulting in light falling on surface comprising resistor 82. To return the system to the null position, it would be necessary then for the lamp and lens to move to the position indicated as 28b, 30b, and in the new position, the image 68 would be focused on point 178 to provide the desired null.

As will be noted from a study of FIG. 3, for any transparency displacement X, the lamp 28 must move a distance Y which equals 2X measured normal or perpendicular to the transparency 20. Because of the fact that the lamp 28 and the support member 24 move twice as much as the slide, gears 34 and 44 are in the ratio of 2:1 and therefore the projection lens 22 moves the same as the slide.

The resistive changes produced in the photoconductive transducer means 70 are converted into error signals by the circuitry of FIG. 2. In the discussion which follows all reference will be to conventional current flow. When the light from a slide is in the null position, falling at point 170 of the transducer 70, the bridge circuit 78 is electrically in balance. The output of the bridge circuit 78 may be conveniently considered to be at terminals 92, 94, respectively. When the bridge circuit 78 is in balance, transistors 112, 116 are cut off. Transistor 112 is cut off, and since the base of transistor 114 is connected to the emitter of transistor 112, transistor 114 is also cut off. In a similar manner, transistor 116 is cut off, and it insures that transistor 118 is also cut off.

Arbitrarily, let us assume that the condition shown at 22a of FIG. 3 obtains, the light falling on the surface identified as resistor 80. As a result there is a decrease in resistance 80, so that the voltage will rise at terminal 94. (Terminal 94 is electrically the same as the connection between resistors 80 and 82.) The base emitter junction of transistor 116 is now forwardly biased and emitter current flows; when transistor 116 turns on, it turns on transistor 118.

It will be helpful to trace the main current flows in channel B. Since there is alternating current across secondary 104, terminals 134, 136 are alternately + and −. We shall assure the condition where terminal 136 is instantaneously positive.

When the voltage rises at terminal 94 current flows through the base emitter junction of transistor 116, through the base emitter of transistor 118, through the resistor diode combination 120, 122 to the other output terminal 92 of the bridge circuit 78. Collector current of course also flows in transistor 116.

When base current flows in transistor 118, collector current flows and may be traced; from terminal 136 (which is considered at the moment to be +), through the collector-emitter junction of transistor 118, through diode 128, through 162, 164 of magnetic reed switch 76, into motor terminal 60, and out of motor terminal 62 to terminal 134 (which we have assumed to be minus). Motor 58 is now energized and it rotates in counterclockwise direction.

As the motor 58 turns, rotary displacement of its drive shaft 56 is transmitted through worm 54, gear 52, worm 48, gear 46, gear 34, and rack 32 to move the support member 24 until the lamp and lens have the position 28a, 30a, respectively as indicated in FIG. 3.

In a similar manner, should a slide be displaced to the condition indicated at 22b, FIG. 3, the light falling on the surface identified as resistor 82 will cause its magnitude to decrease. As a result the voltage at the point joining resistor 80, 82 will fall, and the bridge unbalanced condition will force conventional current out of terminal 92, through the base emitter junction of transistor 112, through the base emitter junction of transistor 114, through the resistor 124 and diode 126 in parallel, to the bridge output terminal 94.

We shall now assume that 134 of secondary 104 is positive. When emitter current flows in transistor 114, it causes collector current to flow in a path which may be traced; terminal 134, through motor terminals 62, 60, through 162, 164 of magnetic reed switch 76, the collector-emitter junction of transistor 114, through diode 130 to terminal 136 which is now negative for the case we have assumed.

The rotary displacement of the motor shaft is transmitted as before, only now in the opposite direction (CW), to the rack 32 to displace the support member 24 until the lamp and lens have the position 28b, 30b respectively as indicated in FIG. 3.

The remote focus switch may be used to advantage:

(a) to set the initial focus on the first slide
(b) to make small corrections in focus where glass mounted slides are used since the automatic focussing system has some difficulty in locating the film through the glass material.

The remote switch 144 may be manually depressed to provide two electrical conditions:

(a) blade element 154 closed to contact 146 (CCW rotation)
(b) blade 156 closed to contact 150 (CW rotation).

Assume that switch 144 is depressed to move element 154 in contact with 146. Taps 134, 140 of secondary 104 are alternating between + and −, but assume the condition where tap 140 is instantaneously +. Current may be traced from tap 140, through diode 158, through 146, 154, through electromagnet 74, to terminals 134–62 (electrically common). The energization of electromagnet 74 pulls reed element 164 to contact 160, and therefore current also flows through contact 160, and into the motor terminal 60 causing the motor to rotate in a counterclockwise rotation.

The energization of electromagnet 74 also serves to clamp the support member 24 (FIG. 1) so that it cannot be displaced. Thus the focus between the slide and the pilot image projecting means 22 will not be disturbed, and the objective lens may be moved with respect to the screen. The rotary motion of the motor 58 is transmitted through worm 54, gear 52, worm 48, gear 46, gear 44 and to the rack 64 on the housing of the objective lens 22.

The clockwise (CW) rotation for the motor 58 is accomplished by closing blade element 156 to contact 150. Assume that terminal 134 of secondary 104 is instantaneously +. The current may be traced thus: terminal 134, through the terminal 62, through the coil of electromagnet 74 through 150, 156, through diode 158 to return to negative tap 140. When the electromagnet is energized, it closes the reed 164 to contact 160, and the circuit for the motor may be traced: terminal 134 through the motor, 164, 160, contact 150 blade element 156, diode 158 to return to the negative tap 140 of secondary 104.

The operator may thus selectively energize the electric motor 58 so as to move the objective lens toward or away from the viewing screen, while at the same time the distance between the slide and the projecting means is held fixed.

The capacitors 84, 86 provide two useful functions for the circuitry: (a) insuring high initial current output for the bridge and (b) anticipating the null position and preventing hunting of the motor 58. In order to more fully appreciate the dual roles played by the capacitors, assume for discussion that the bridge circuit 78 is supplied with a voltage in the order of magnitude of 40 volts. The capacitors 84, 86 will therefore each be charged to approximately 20 volts. The bridge current output is a function of the change in current brought about by the light beam falling upon the surfaces of either resistor 80 or resistor 82 respectively, plus the transient capacitor current. As is well-known, since the voltage across a capacitor cannot change instantly, the initial electrical disturbance to the bridge produces an initial surge current which is large, and which is transmitted to either of the output terminals 92 or 94, where it is amplified by the transistor network of channels A or B, and is immediately applied to the input terminals of motor 58. This has the advantageous effect of overcoming the inertia of the motor, and starting it rotating in a direction to correct the condition. As the transient situation coninues, the bridge current begins to fall off, so that D.C. pulses of decreasing magnitudes are applied to the motor 58. Concurrently, the capacitors 84, 86 are charging to a potential somewhat higher than the initial 20 volts, and the higher charged capacitors then attempt to send current through the bridge circuit 78 in the opposite direction. This is tantamount to anticipating that the null position will soon be reached by the light beam. As the output bridge current goes through zero, some small current is actually forced in the opposite direction. Although it is of small amplitude, the net result is that pulses of opposite polarity and small amplitude are then applied to the motor 58. This has a braking effect on the rotation of the motor and derivatively has the effect of anticipating the null position of the light beam, and preventing hunting by the motor 58.

Obviously, many modifications and variations of the present invention are possible. In light of the above teachings, it is therefore to be understood that, within the scope of the appended claims, the invention may be practiced other than as specifically described and illustrated.

We claim:

1. Focus adjusting circuitry for a slide projector having an objective lens, and first and second focal distances measured on opposite sides of said objective lens, the first focal distance being defined as the distance between photographic transparency slide and a pilot image projection means arranged to project a pilot image on the photographic transparency, the second focal distance being defined as the distance between the objective lens and the viewing screen, comprising in combination.

(a) a bridge circuit comprising input and output terminals;
(b) a source of D.C. energy connected to the input terminals of said bridge circuit;
(c) photoconductive transducer means arranged to form two resistive arms for said bridge circuit, the resistive arms having an ohmic magnitude which is a function of the incident radiant energy, said photoconductive transducer means being arranged to define a null when reflected light from a substantially planar transparency produces equal resistive arms in said photoconductive transducer means;
(d) a first amplifying channel connected in series with one of said output terminals of said bridge circuit;
(e) a second amplifying channel connected in series with the other output terminal of said bridge circuit;
(f) a reversible electric motor adapted to receive polarized signals from either one of said amplifying channels respectively, the outputs of said amplifying channels respectively having such polarity so as to effect either clockwise or counterclockwise rotational displacement of the shaft of said reversible electric motor;

(g) magnetic reed switching means having first and second contacts, the first contact being normally closed in electric circuit relation with said first and second amplifying channels;

(h) remote switching means comprising first and second contact pairs adapted to be manually closed respectively;

(i) electromagnetic means connected in series with the said second contact of said magnetic reed switching means, and with both contact pairs of said remote switching means;

(j) a second source of D.C. energy connected to said electric reversible motor through said electromagnetic means and said remote switching means, whereby when the bridge circuit is unbalanced one of the amplifying channels conducts to provide pulsating D.C. signals of predetermined polarity to said reversible electric motor, to maintain constant said first focal distance, and when the said remote switching means are selectively energized, the first and second amplifying channels are disabled, and said reversible electric motor is selectively energized through said first and second contact pairs respectively, the resulting electrical energy supplied to the reversible electric motor providing selective clockwise or counterclockwise rotation to change the second focal distance.

2. Focus adjusting circuitry for a slide projector having an objective lens, and first and second focal distances measured on opposite sides of said objective lens, the first focal distance being defined as the distance between a photographic transparency slide and a pilot image projection means arranged to project a pilot image on the photographic transparency member, the second focal distance being defined as the distance between the objective lens and a viewing screen, comprising in combination:

(a) a bridge circuit comprising first and second resistor arms of equal magnitude, and input and output terminals;

(b) a source of D.C. energy connected to the input terminals of said bridge circuit;

(c) photoconductive tranducer means arranged to form third and fourth resistor arms for said bridge circuit, the third and fourth resistors having ohmic values respectively which are a function of the incident radiant energy thereon, said photoconductive transducer means being arranged to define a null when reflected light from a substantially planar transparency produces equal resistive arms in said photoconductive transducer means;

(d) first and second capacitive means shunting said first and second resistor arms respectively;

(e) a first amplifying channel connected in series with one of said output terminals of said bridge circuit;

(f) a second amplifying channel connected in series with the other output terminal of said bridge circuit;

(g) a reversible electric motor adapted to receive polarized signals from either one of said amplifying channels respectively, the outputs of said amplifying channels having such polarity so as to effect either clockwise or counterclockwise rotational displacement of the shaft of said reversible electric motor;

(h) magnetic reed switching means having first and second contacts, the first contact being normally closed in electric circuit relation with said first and second amplifying channels;

(i) remote switching means having first and second contact pairs adapted to be closed respectively;

(j) electromagentic means connected in series with the said second contact of said magnetic reed switching means, and with both contact pairs of said remote switching means;

(k) a second source of D.C. signal connected to said reversible electric motor through said electromagnetic means and said remote switching means, whereby when the bridge circuit is unbalanced one of the amplifying channels conducts to provide pulsating D.C. signals of predetermined polarity to said reversible electric motor to maintain constant the first focal distance and when the said remote switching means is selectively energized, the said first and second amplifying channels are disabled, said reversible electric motor is selectively energized through said first and second contact pairs respectively, the resulting electrical energy supplied to the reversible electric motor providing selective clockwise or counterclockwise rotation to change the second focal distance.

3. Focus adjusting circuitry for a slide projector having an objective lens, and first and second focal distances measured on opposite sides of said objective lens, the first focal distance being defined as the distance between a photographic transparency slide and a pilot image projecing means arranged to project a pilot image on the photographic transparency, the second focal plane being defined as the distance between the objective lens and the viewing screen comprising in combination:

(a) a bridge circuit comprising input and output terminals;

(b) a source of D.C. energy connected to the input terminals of said bridge circuit;

(c) photoconductive transducer means arranged to form two resistive arms for said bridge circuit, the resistive arms each having an ohmic magnitude which is a function of the incident radiant energy thereon, said photoconductive transducer being arranged to define a null when reflected light from a substantially planar transparency produces equal resistive arms in said photoconductive transducer means;

(d) a first amplifying channel connected in series with one of said output terminals of said bridge circuit;

(e) a second amplifying channel connected in series with the other output terminal of said bridge circuit;

(f) a reversible electric motor adapted to receive polarized signals from either one of said amplifying channels respectively, the outputs of said amplifying channels having such polarity so as to effect either clockwise or counterclockwise rotational displacement of the shaft of said reversible electric motor;

(g) magnetic reed switching means having first and second contacts, the first contact being normally closed in electric circuit relation with said first and second amplifying channels;

(h) remote switching means having first and second contact pairs and a diode, arranged so that the electrical closure of either the first or second contact pair provides unidirectional current transfer through said remote switching means;

(i) electromagnetic means connected in series with the said second contact of said magnetic reed switching means, and with both contact pairs of said remote switching means; and (j) a second source of electrical energy connected to said motor through said electromagnetic means and said remote switching means, whereby when the bridge circuit is unbalanced one of the amplifying channels conducts to provide pulsating D.C. signals of predetermined polarity to said reversible electric motor, to maintain constant the first focal distance, and when the said remote switching means is selectively energized, the said first and second amplifying channels are disabled, and said reversible electric motor is selectively energized through said first and second contact pairs respectively, the resulting electrical energy supplied to the reversible electric motor providing selective clockwise or counterclockwise rotation to change the second focal distance.

4. Focus adjusting circuitry for a slide projector having an objective lens, and first and second focal distances measured on opposite sides of said objective lens, the first focal distance being defined as the distance between a photographic transparency and a pilot image projection means arranged to project a pilot image on a photographic transparency, the second focal distance being defined as the distance between the objective lens and a viewing screen, comprising in combination:

(a) a bridge circuit comprising input and output terminals;
(b) a transformer having its primary connected to a line voltage source;
(c) rectifying means, energized by the transformer secondary, and connected to the input terminals of said bridge circuit;
(d) photoconductive transducer means arranged to form two resistive arms for said bridge circuit, each resistive arm having a respective ohmic magnitude which is a function of the incident radiant energy, said photoconductive transducer means being arranged to define a null when reflected light from a substantially planar transparency produces equal resistive arms in said photoconductive transducer means;
(e) a first amplifying channel connected in series with one of said output terminals of said bridge circuit;
(f) a second amplifying channel connected in series with the other output terminal of said bridge circuit;
(g) a reversible electric motor adapted to receive polarized signals from either one of said amplifying channels respectively, the outputs of said amplifying channels respectively, having such polarity so as to effect either clockwise or counterclockwise rotational displacement of the shaft of said reversible electric motor;
(h) magnetic reed switching means having first and second contacts, the first contact being normally closed in electric circuit relation with said first and second amplifying channels;
(i) remote switching means connected to the transformer secondary comprising first and second contact pairs and a diode, said contact pairs and diode being arranged so that the electrical closure of either the first or second contact pair provides unidirectional current transfer through said remote switching means;
(j) electromagnetic means connected in series with the said second contact of said magnetic reed switching means, and with both contact pairs of said remote switching means, whereby when the bridge circuit is unbalanced one of the amplifying channels conducts to provide pulsating D.C. signals of predetermined polarity to said reversible electric motor to maintain constant the first focal distance, and when the said remote switching means is selectively energized, the said first and second amplifying channels are disabled, and said reversible electric motor is selectively energized through said first and second contact pairs respectively, the resulting electrical energy supplied to the reversible electric motor providing selective clockwise or counterclockwise rotation to change the second focal distance.

5. A focus adjusting circuitry for a slide projector having an objective lens, and first and second focal distances measured on opposite sides of said objective lens, the first focal distance being defined as the distance between a photographic transparency and a pilot image projection means arranged to project a pilot image on the photographic transparency, the second focal distance being defined as the distance between the objective lens and a viewing screen comprising in combination:

(a) a bridge circuit comprising first and second resistor arms of equal magnitude and input and output terminals;
(b) a transformer having its primary connected to a line source of voltage;
(c) rectifying means energized by the transformer secondary, and connected to the input terminals of said bridge circuit;
(d) photoconductive transducer means arranged to form third and fourth resistor arms for said bridge circuit, the third and fourth resistor arms having ohmic values respectively which are a function of the incident radiant energy thereon, said photoconductive transducer means being arranged to define a null when reflected light from a substantially planar transparency produces equal resistor arms in said photoconductive transducer means,
(e) first and second capacitive means shunting said first and second resistor arms respectively,
(f) a first channel comprising first and second transistors arranged in amplifying cascade and connected in series with one of said output terminals of said bridge circuit;
(g) a second channel comprising third and fourth transistors arranged in amplifying cascade and connected in series with the second output terminal of said bridge circuit;
(h) a reversible electric motor adapted to receive polarized signals from either one of said amplifying channels respectively, the outputs of said channels having respective polarities so as to effect either clockwise or counterclockwise rotational displacement of the shaft of said reversible electric motor;
(i) magnetic reed switching means having first and second contacts, the first contact being normally closed in electric circuit relation with said first and second channels;
(j) remote switching means connected to the transformer secondary comprising first and second contact pairs and a diode arranged so that the electrical closure of either the first or second contact pair provides unidirectional current transfer through said remote switching means;
(k) electromagnetic means connected in series with the said second contact of said magnetic reed switching means, and with both contact pairs of said remote switching means, whereby when the bridge circuit is unbalanced one of the channels conducts to provide pulsating D.C. signals of predetermined polarity to said reversible electric motor, to maintain said first focal distance constant, and when the said remote switching means is selectively energized, the said first and second channels are disabled, and said reversible electric motor is selectively energized through said first and second contact pairs respectively, the resulting electrical energy supplied to the reversible electric motor providing selective clockwise or counterclockwise rotation to change the second focal distance.

References Cited

UNITED STATES PATENTS

| | | | |
|---|---|---|---|
| 3,037,423 | 6/1962 | Schurcliff | 353—101 |
| 3,249,001 | 5/1966 | Stauffer | 353—101 |
| 3,249,006 | 5/1966 | Stauffer | 353—101 |
| 3,249,007 | 5/1966 | Stauffer | 353—101 |
| 3,264,935 | 8/1966 | Vose | 353—101 |
| 3,296,924 | 1/1967 | Levin et al. | 353—69 |
| 3,342,102 | 9/1967 | Maxon | 353—69 |

NORTON ANSHER, Primary Examiner

RICHARD M. SHEER, Assistant Examiner

U.S. Cl. X.R.

352—140; 353—69